United States Patent [19]
Haker

[11] Patent Number: 5,961,241
[45] Date of Patent: Oct. 5, 1999

[54] CONNECTOR FOR SLING DEVICES

[75] Inventor: Ulrich Haker, Aalen, Germany

[73] Assignee: RUD-Kettenfabrik Rieger & Dietz GmbH u. Co., Aalen-Unterkochen, Germany

[21] Appl. No.: 09/011,211

[22] PCT Filed: Jul. 31, 1996

[86] PCT No.: PCT/DE96/01481

§ 371 Date: Jan. 28, 1998

§ 102(e) Date: Jan. 28, 1998

[87] PCT Pub. No.: WO97/06092

PCT Pub. Date: Feb. 20, 1997

[30] Foreign Application Priority Data

Aug. 3, 1995 [DE] Germany ............................ 195 30 166

[51] Int. Cl.⁶ .................... B66C 1/66; F16G 15/08
[52] U.S. Cl. ..................... 403/79; 403/164; 403/155; 59/93
[58] Field of Search ................. 403/11, 12, 326, 403/327, 329, 79, 78, 155, 154, 157, 150, 164; 59/85, 86, 93; 294/82.1, 1.1

[56] References Cited

U.S. PATENT DOCUMENTS

| 4,505,058 | 3/1985 | Peterson ........................... 403/326 X |
|---|---|---|
| 4,705,422 | 11/1987 | Tsui et al. .......................... 403/164 X |
| 5,048,996 | 9/1991 | DuBois et al. ..................... 403/326 X |
| 5,405,210 | 4/1995 | Tsui .................................... 403/78 X |
| 5,586,801 | 12/1996 | Sawyer et al. ....................... 403/78 X |
| 5,641,239 | 6/1997 | Michalek ........................... 403/329 X |
| 5,743,576 | 4/1998 | Schron, Jr et al. ................. 403/78 X |

FOREIGN PATENT DOCUMENTS

| 179733 | 4/1986 | European Pat. Off. . |
|---|---|---|
| 1534833 | 8/1968 | France . |
| 29513183 | 7/1981 | Germany . |
| 3301960 | 8/1984 | Germany . |
| 3509877 | 7/1986 | Germany . |
| 8618070 | 9/1986 | Germany . |
| 3803248 | 3/1989 | Germany . |

*Primary Examiner*—Lynne Reichard
*Assistant Examiner*—John R. Cottingham
*Attorney, Agent, or Firm*—Mark P. Stone

[57] ABSTRACT

In the case of a connecting device having a connecting part (1) and a fastening part (3), the two abovementioned parts are connected to each other with the aid of a clamping spring (5) to form a non-releasable, preassembled unit. In order to ensure that the two parts are held together securely, the clamping spring partially encloses a pivot section (2) of the connecting part (1) and is supported, by way of the ends of two retaining legs (7, 8), against stops (9, 10) formed by the front sides of a groove (4).

18 Claims, 1 Drawing Sheet

CONNECTOR FOR SLING DEVICES

BACKGROUND OF THE INVENTION

CONNECTING DEVICES FOR FIXING MEANS

The invention relates to a connecting device for fixing means, especially sling chains, having at least one fastening part for fitting the device to a vehicle, an object to be transported or the like, and having a connecting part for connecting the fixing means, the fastening part forming a bearing, constructed in the manner of a stirrup, for the connecting part, which can pivot about a pivot section, and a clamping spring, which partially engages around a section of the connecting part and is provided with retaining legs to lock it in the fastening part, being used to hold the fastening part and the connecting part together.

A connecting device of the above type is disclosed by DE-C-3509877. In the case of the known connecting device, the clamping spring, which is essentially constructed like the letter omega, is retained in the fastening part by the ends of its retaining legs being latched into latching grooves on the inner side of an approximately U-shaped fastening part. In this case, the yoke of the spring is located on the same side of the pivot section of the connecting part as the yoke of the fastening part. This arrangement makes it possible firstly to insert the spring into the fastening part and then to press the pivot section of the connecting part into the spring stirrup formed by the retaining legs and the yoke of the spring. The known device is not able to be completely satisfactory insofar as the arrangement and shape of its clamping spring does not provide any absolute guarantee that the unit formed by the connecting part and the fastening part will be held together during transportation and the often "rough" handling before final installation. Attempts to overcome this problem by increasing the stiffness of the spring have not led to a satisfactory result, since increasing the spring stiffness simultaneously makes the joining of the components more difficult.

SUMMARY OF THE INVENTION

The invention is based on the object of reconfiguring a connecting device of the type being considered, in such a way that not only is it possible to join the parts of said connecting device more easily than before, but it is also ensured that the parts are held together securely, even under difficult conditions. In the case of a device of the generic type, this object is achieved, according to the invention, in that the fastening part is provided on its inner side with a semiannular groove, which is bounded at its ends by stops and is intended to accommodate the retaining legs of the clamping spring, in that the clamping spring engages around the pivot section—apart from a section facing the vertex of the clamping spring—and in that the ends of the retaining legs of the clamping spring, said retaining legs being directed away from the vertex of the groove and engaging in the groove, are supported against the stops, forming a positively locking retainer for the connecting part.

In the case of the connecting device according to the invention, the problems that occur in connection with the known connecting device are eliminated. Connecting part and fastening part form a captive unit that is preassembled at the factory. Because of their simple shape, both the clamping spring and the groove accommodating it may be produced particularly economically. When the fastening part and connecting part are assembled, firstly the clamping spring is placed onto the pivot pin of the fastening part in the manner of a clip and then the pivot section, together with the clamping spring, is pressed into the connecting part, the ends of the clamping spring, which are bent over only once, coming to rest in the groove.

BRIEF DESCRIPTION OF THE DRAWINGS

Further details and features of the invention emerge from the subclaims and following description of a preferred embodiment that is illustrated in the appended drawing, in which:

DESCRIPTION OF THE BEST MODES FOR CARRYING OUT THE INVENTION

Figure 1:
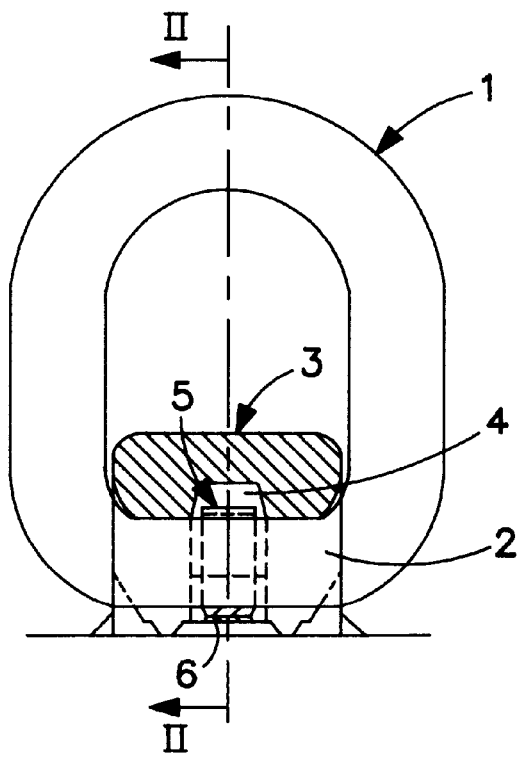
FIG. 1 shows, partially in section, the front view of a connecting device.
Figure 2:
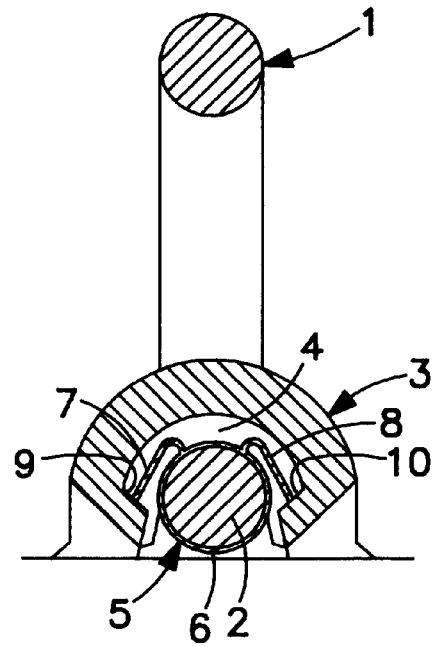
FIG. 2 shows a section along the line II—II in FIG. 1.
Figure 3:
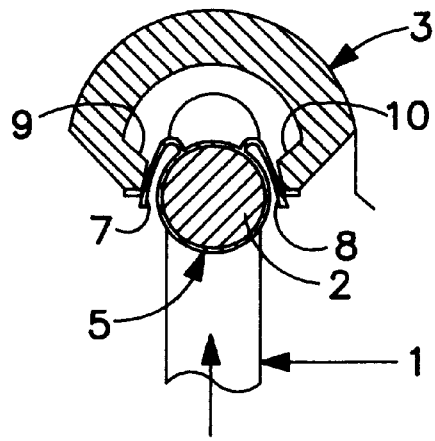
FIG. 3 shows the manner in which the parts illustrated in FIGS. 1 and 2 are joined.

In the figures, 1 is an eye-like connecting part having a rectilinear section forming a pivot section 2. The connecting part 1 is pivotably mounted in a fastening part 3, which is formed by an essentially U-shaped stirrup. Located on the inner side of the fastening part 3 is a semiannular groove 4 to accommodate a clamping spring 5, which has a section 6, that encloses the pivot pin 2 and two retaining legs 7 and 8 that adjoin said section 6 and are formed simply by being bent over. As can be seen from FIG. 2, the ends of the approximately rectilinear retaining legs 7 and 8 of the clamping spring 5 rest against the front walls, forming the stops 9 and 10, of the groove 4 and, together with the section 6, form a positively locking retainer for the pivot section 2 of the connecting part 1. As illustrated by FIG. 3, the stops 9 and 10 can protrude into the groove 4.

The shape that is selected for the clamping spring 5 provides for reliable anchoring of the connecting part 1 in the fastening part 3, and this anchoring cannot be released without destroying the clamping spring 5.

The joining of the parts is simple, since the spring forces that have to be overcome both when the clamping spring 5 is pushed onto the pivot section 2 and during the insertion of the pivot section 2 provided with the clamping spring 5 into the fastening part 3 can be kept low, because of the shape of the spring, without the strength of the connection being impaired thereby. The manner of joining is illustrated in FIG. 3. It can be seen that the connecting part 1, together with the clamping spring 5, is pressed from below into the fastening part and then pivoted through at least 90°. In the case of the embodiment described, the length of the retaining legs 7 and 8 of the clamping spring is approximately equal to the diameter of the pivot section 2. It should be at least equal to half the diameter of the pivot section.

I claim:

1. A connecting device for fixing means having at least one fastening part for fitting the device to a vehicle or to an object to be transported, and having a connecting part for connecting the fixing means; the fastening part forming a bearing, constructed in the manner of a stirrup, for the connecting part, which is pivotable about a pivot section; and a clamping spring, which partially engages around a section of the connecting part and is provided with retaining legs to lock the clamping spring in the fastening part, for holding the fastening part and the connecting part together; wherein the fastening part (3) is provided on an inner side thereof, with a single groove (4) extending into the surface of the inner side, which is bounded at its ends by stops (9, 10) for accommodating the retaining legs (7, 8) of the clamping spring (5); wherein the clamping spring (5) comprises a portion encircling at least the part of the pivot section (2) facing away from the single groove; and wherein the retaining legs (7, 8) of the clamping spring (5) are formed by bent prolongations of said encircling portion, said prolongations being directed away from the vertex of the single groove (4) and its ends being supported against the ends of the single groove (4) forming the stops (9, 10) for positively locking the connecting part (1) in the fastening part (3).

2. The connecting device as claimed in claim 1, wherein the fastening part (3) is constructed as a U-shaped stirrup and the connecting part (1) is constructed as an eye.

3. The connecting device as claimed in claim 1, wherein the retaining legs (7, 8) of the clamping spring (5) are of approximately rectilinear construction, said retaining legs having front sides which rest against the stops (9, 10).

4. The connecting device as claimed in claims 1, wherein the length of the retaining legs (7, 8) of the clamping spring (5) is at least equal to half the diameter of the pivot section (2) of the connecting part (1).

5. The connecting device as claimed in claim 2, wherein the retaining legs (7, 8) of the clamping spring (5) are of approximately rectilinear construction, said retaining leas having front sides which rest against the stops (9, 10).

6. The connecting device as claimed in claim 2, wherein the length of the retaining legs (7, 8) of the clamping spring (5) is at least equal to half the diameter of the pivot section (2) of the connecting part (1).

7. The connecting device as claimed in claim 3, wherein the length of the retaining legs (7, 8) of the clamping spring (5) is at least equal to half the diameter of the pivot section (2) of the connecting part (1).

8. The connecting device as claimed in claim 5, wherein the length of the retaining legs (7, 8) of the clamping spring (5) is at least equal to half the diameter of the pivot section (2) of the connecting part (1).

9. A connecting device for fixing means having at least one fastening part for fitting the device to a vehicle or to an object to be transported, and having a connecting part for connecting the fixing means; the fastening part forming a bearing, constructed in the manner of a stirrup, to define an interior space for the connecting part, which is pivotable about a pivot section; and a clamping spring, which partially engages around a section of the connecting part and is provided with retaining legs to lock the clamping spring in the fastening part, for holding the fastening part and the connecting part together; wherein the fastening part (3) is provided on an inner side thereof, with a single groove (4), which is bounded at its ends by stops (9, 10) protruding into the interior space of the fastening part for accommodating the retaining legs (7, 8) of the clamping spring (5); wherein the clamping spring (5) comprises a portion encircling at least the part of the pivot section (2) facing away from the single groove (4); and wherein the retaining legs (7, 8) of the clamping spring (5) are formed by bent prolongations of said encircling portion, said prolongations being directed away from the vertex of the single groove (4) and its ends being supported against the ends of the single groove (4) forming the stops (9, 10) for positively locking the connecting part (1) in the fastening part (3).

10. The connecting, device as claimed in claim 9, wherein the fastening part (3) is constructed as a U-shaped stirrup and the connecting part (1) is constructed as an eye.

11. The connecting device as claimed in claim 9, wherein the retaining legs (7, 8) of the clamping spring (5) are of approximately rectilinear construction, said retaining legs having front sides which rest against the stops (9, 10).

12. The connecting device as claimed in claim 9, wherein the length of the retaining legs (7, 8) of the clamping spring (5) is at least equal to half the dimeter of the pivot section (2) of the connecting part (1).

13. The connecting device as claimed in claim 10, wherein the retaining legs (7, 8) of the clamping spring (5) are of approximately rectilinear construction, said retaining legs having front sides which rest against the stops (9, 10).

14. The connecting device as claimed in claim 10, wherein the length of the retaining legs (7, 8) of the clamping spring (5) is at least equal to half the diameter of the pivot section (2) of the connecting part (1).

15. The connecting device as claimed in claim 11, wherein the length of the retaining legs (7, 8) of the clamping spring (5) is at least equal to half the diameter of the pivot section (2) of the connecting part (1).

16. The connecting device as claimed in claim 13, wherein the length of the retaining legs (7, 8) of the clamping spring (5) is at least equal to half the diameter of the pivot section (2) of the connecting part (1).

17. The connecting device as claimed in claim 1 wherein said fixing means comprises a sling chain.

18. The connecting device as claimed in claim 9 wherein said fixing means comprises a sling chain.

* * * * *